(12) United States Patent
Seo

(10) Patent No.: US 11,572,941 B2
(45) Date of Patent: Feb. 7, 2023

(54) WAVE GENERATOR FOR REDUCER OF HARMONIC DRIVE STRUCTURE

(71) Applicant: Robostar Co., Ltd., Ansan-si (KR)

(72) Inventor: Choong-seog Seo, Suwon-si (KR)

(73) Assignees: ROBOSTAR CO., LTD., Ansan-si (KR); Choong-Seog Seo, Suwon-si (KR)

( * ) Notice: Subject to any disclaimer, the term of this patent is extended or adjusted under 35 U.S.C. 154(b) by 261 days.

(21) Appl. No.: 16/940,651

(22) Filed: Jul. 28, 2020

(65) Prior Publication Data
US 2021/0123514 A1 Apr. 29, 2021

(30) Foreign Application Priority Data

Oct. 25, 2019 (CN) .......................... 201911022903.9
Mar. 25, 2020 (CN) .......................... 202010219368.2

(51) Int. Cl.
*F16H 49/00* (2006.01)
*F16H 1/32* (2006.01)

(52) U.S. Cl.
CPC ............. *F16H 49/001* (2013.01); *F16H 1/32* (2013.01); *F16H 2049/003* (2013.01)

(58) Field of Classification Search
CPC .................................................. F16H 49/001
USPC ........................................................ 74/640
See application file for complete search history.

(56) References Cited

U.S. PATENT DOCUMENTS

| | | | | | |
|---|---|---|---|---|---|
| 3,101,009 | A | * | 8/1963 | Walton | F16H 49/001 74/640 |
| 3,178,963 | A | * | 4/1965 | Walton | H02K 7/116 74/640 |
| 3,182,525 | A | * | 5/1965 | Tinder | F16H 49/001 74/640 |
| 4,974,470 | A | * | 12/1990 | Ishikawa | F16H 49/001 74/640 |
| 7,274,805 | B2 | * | 9/2007 | Horie | H04N 7/185 348/E7.086 |

FOREIGN PATENT DOCUMENTS

KR 10-2011-0112027 10/2011

* cited by examiner

*Primary Examiner* — Ha Dinh Ho
(74) *Attorney, Agent, or Firm* — Lex IP Meister, PLLC

(57) ABSTRACT

Disclosed herein is a wave generator for a reducer of a harmonic drive structure. The reducer of a harmonic drive structure includes: a circular spline of a ring shape; a flex spline mounted inside the circular spline and having teeth engaged with teeth formed at three or more positions of the inner circumferential surface of the circular spline to be rotated; and a wave generator mounted inside the flex spline, and including a cam plate of a circular shape, and three or more protrusions formed at three or more positions of the outer circumferential surface of the circular cam plate so that the protrusions formed on the outer circumferential surface of the cam plate elastically deform the three or more positions inside the flex spline.

5 Claims, 5 Drawing Sheets

WAVE GENERATOR FOR REDUCER OF HARMONIC DRIVE STRUCTURE

BACKGROUND OF THE INVENTION

Field of the Invention

The present invention relates to a harmonic drive, and more particularly, to a wave generator for a reducer of a harmonic drive structure.

Background Art

A harmonic drive has been widely used in industrial robots, numerical control (NC) type machine tools, semiconductor manufacturing systems, and so on. The harmonic drive is small and lightweight, has increased transfer torque, can obtain a high reduction gear ratio, has very little backlash, and is excellent at angular transmission and rotation.

Such a conventional harmonic drive includes a wave generator, a flex spline, and a circular spline. The wave generator includes a plug therein. The plug is formed in an oval shape, is connected with an input shaft of a driving system in order to transfer a rotary motion, and elastically deforms the flex spline of a thin cup form by the shape of the plug of the wave generator so that the flex spline causes a reduced rotary motion in the opposite direction.

The wave generator rotates by rotary power from the input shaft of the driving system, and the flex spline is changed into the same shape as the plug, namely, into the oval shape, so that the position of teeth engaged with teeth of the circular spline at a long axis part of the oval shape moves in consecutive order. When the wave generator completely makes one revolution, the flex spline rotates in the opposite direction as much as a difference in the number of the teeth, and such rotation in the opposite direction causes reduction of speed.

Because the harmonic drive operates in a teeth engagement structure of a symmetric form at the long axis part of the oval shape, if it is assembled by constraint or ratcheting impact with a great external force is applied, Dedoi-dal phenomenon that the engagement of the teeth between the circular spline and the flex spline momentarily becomes out of alignment happens a lot.

PATENT LITERATURE

Patent Documents

Patent Document 1: Korean Patent Publication No. 10-2011-0112027 published on Oct. 12, 2011

SUMMARY OF THE INVENTION

Accordingly, the present invention has been made to solve the above-mentioned problems occurring in the prior arts, and it is an object of the present invention to provide a wave generator for a reducer with a harmonic drive structure that teeth rotate in engagement with other teeth at three or more locations at the same time.

Technical objects to be achieved by the present invention are not limited to the above-described objects and may be expanded in various ways without departing from the scope and spirit of the present invention.

To accomplish the above object, according to the present invention, there is provided a reducer of a harmonic drive structure including: a circular spline of a ring shape; a flex spline mounted inside the circular spline and having teeth engaged with teeth formed at three or more positions of the inner circumferential surface of the circular spline to be rotated; and a wave generator mounted inside the flex spline, and including a cam plate of a circular shape, and three or more protrusions formed at three or more positions of the outer circumferential surface of the circular cam plate so that the protrusions formed on the outer circumferential surface of the cam plate elastically deform the three or more positions inside the flex spline.

Moreover, the wave generator includes: a cam plate having a circular central part and protrusions formed at three or more positions of the outer circumferential surface of the central part; and a ball bearing formed on the outer face thereof to surround the cam plate and elastically deformed by the protrusions formed on the outer circumferential surface of the cam plate.

Furthermore, radiuses $R2$ of different circles respectively including the protrusions formed at the three or more positions are all equal, and the relation between the radius $R2$ and a radius $R1$ of the central part is defined in a math formula ($R2=k \times R1$), wherein k is a proportional constant which is within a range of 0.6 to 0.8.

Additionally, the proportional constant k is 0.7.

Moreover, the protrusions formed at the three or more positions are formed at regular intervals around a rotary shaft of the wave generator.

Furthermore, the flex spline has teeth formed on the outer circumferential surface thereof and is elastically deformed by the shape of the wave generator, and the teeth of the elastically deformed part are engaged with the teeth formed on the inner circumferential surface of the circular spline.

According to the present invention, three or more protrusions are disposed on the outer circumferential surface of the circular wave generator at regular intervals and teeth of the flex spline where the three or more protrusions are located are engaged with teeth of the circular spline at the same time so as to achieve a stable teeth engaged state. Therefore, the wave generator for the reducer of the harmonic drive structure can prevent Dedoi-dal phenomenon that the teeth between the circular spline and the flex spline get out of alignment.

Moreover, when compared with reducers of the same level, the wave generator for the reducer of the harmonic drive structure according to the present invention can remarkably increase a teeth engagement rate and also greatly enhance reducer performance items, such as rated torque, peak torque, and so on.

Effects of the present invention are not limited to the above-described effects and may be expanded in various ways without departing from the scope and spirit of the present invention.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
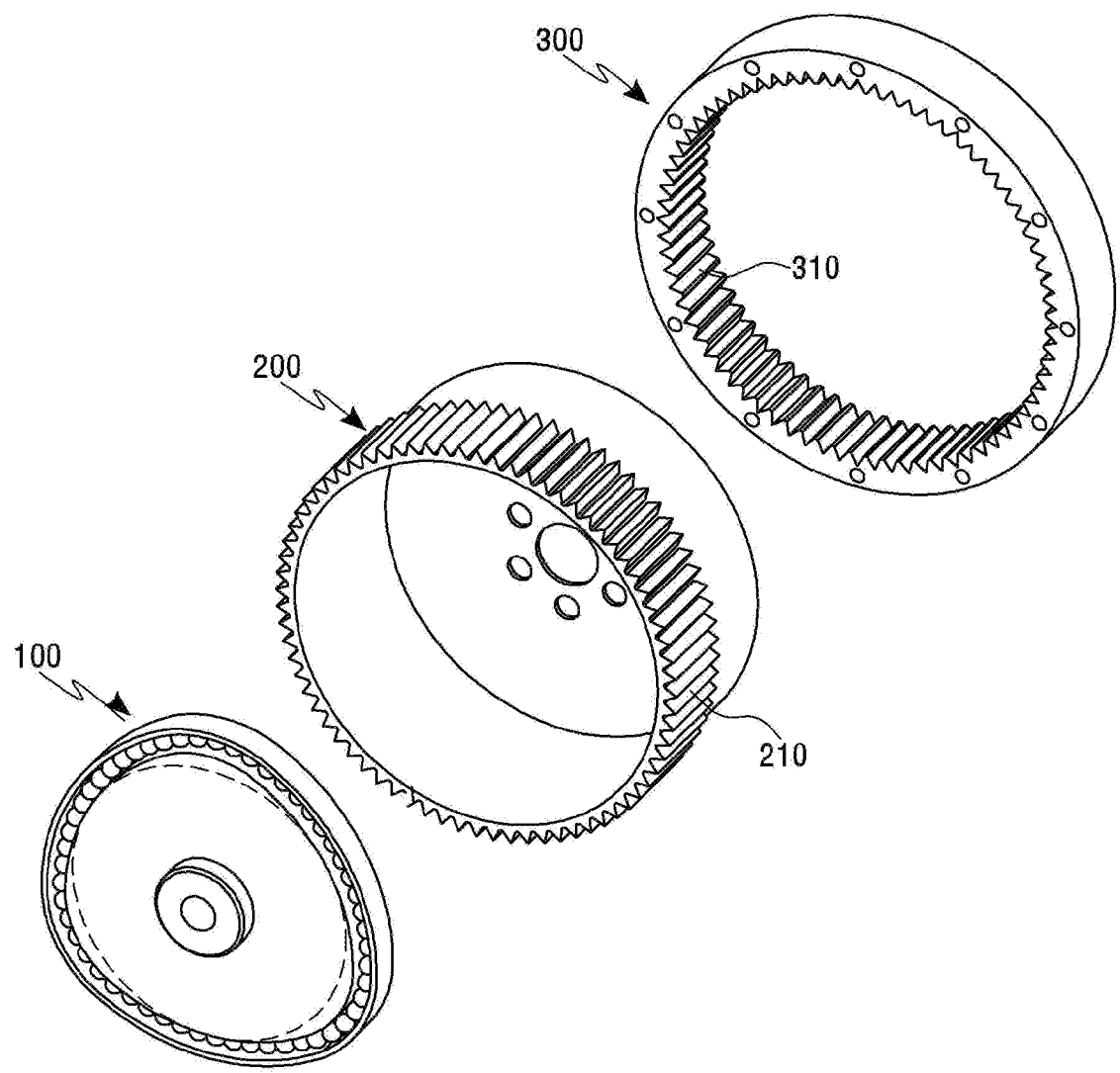
FIG. 1 is a view showing a harmonic driver according to an embodiment of the present invention.

Specific embodiments of the present invention are described in detail below with reference to the accompanying drawings. The embodiments are described in detail in order for those skilled in the art to readily implement the present invention. It is to be understood that the various embodiments of the present invention are different from each other, but do not need to be exclusive. For example, a specific shape, structure and characteristic described in this specification in connection with an embodiment may be implemented as another embodiment without departing from the spirit and scope of the present invention. It is also to be understood that the position or arrangement of an individual element within each disclosed embodiment may be changed without departing from the spirit and scope of the present invention. Accordingly, the detailed description hereinafter is not intended to have a limited meaning, and the range of right of the present invention is restricted by only the attached claims along with the entire range equivalent to things claimed by the claims, if it is appropriately described. Similar reference numerals in the drawings denote the same or similar functions from several aspects.

Hereinafter, a wave generator for a reducer of a harmonic drive structure according to an exemplary embodiment of the present invention is described in detail with reference to the accompanying drawings. Especially, a circular wave generator according to an embodiment of the present invention includes three or more protrusions disposed on the outer circumferential surface thereof at regular intervals, and teeth of a flex spline where the three or more protrusions are located are engaged with teeth of a circular spline at the same time.

Figure 2A:
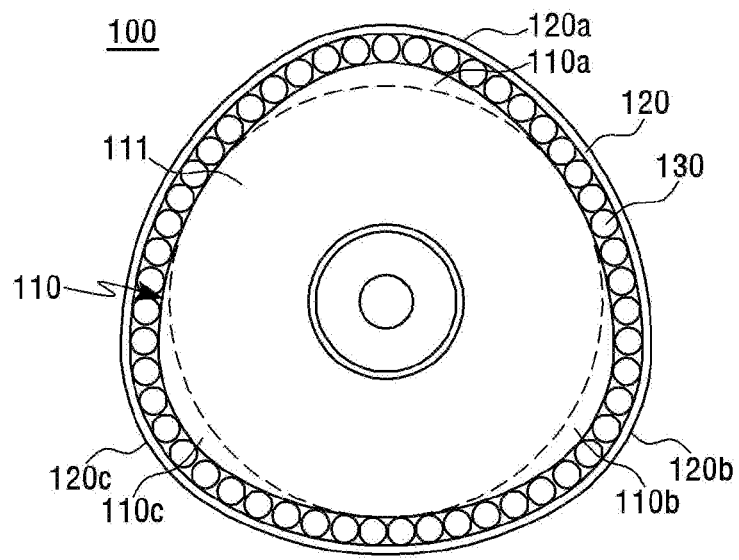
FIGS. 2a to 2c are views showing a shape of a wave generator illustrated in FIG. 1.
Figure 2B:
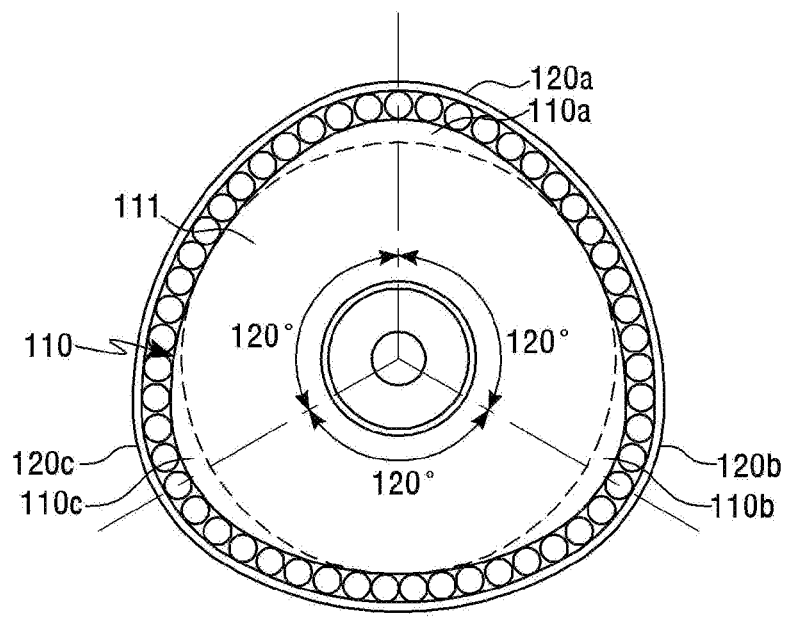
Figure 2C:
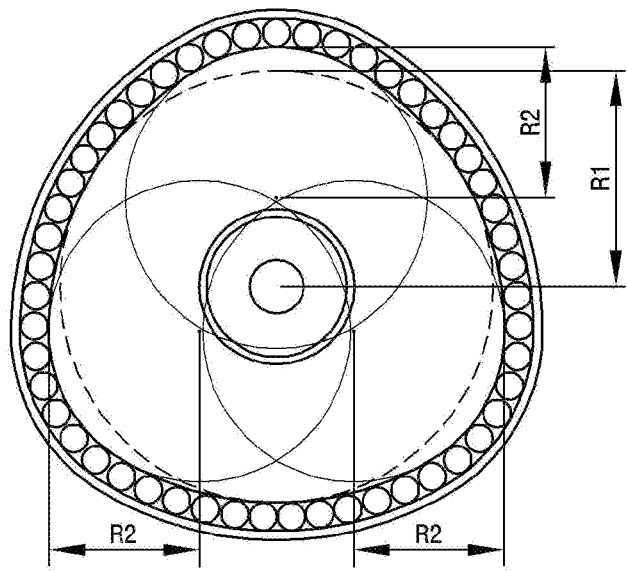

FIG. 1 is a view showing a harmonic driver according to an embodiment of the present invention, and FIGS. 2a to 2c are views showing a shape of a wave generator illustrated in FIG. 1.

Referring to FIG. 1, harmonic driver according to the embodiment of the present invention includes a wave generator 100, a flex spline 200, and a circular spline 300.

The wave generator 100 is generally in the form of a triangular shape and is connected with an input shaft to do a rotary motion. The wave generator 100 is mounted inside the flex spline 200 to elastically deform the flex spline 200, so that the flex spline 200 causes a reduced rotary motion in the opposite direction.

Referring to FIGS. 2a and 2b, the wave generator 100 according to the embodiment of the present invention includes a cam plate 110 and a ball bearing 120 formed on the outer face thereof to surround the cam plate 110.

The cam plate 110 includes a circular central part 111 and crescent protrusions 110a, 110b and 110c formed at three or more positions on the outer circumferential surface of the central part 111. The cam plate 110 is connected to the input shaft to do a rotary motion. The crescent protrusions 110a, 110b and 110c formed at three or more positions are formed at regular intervals and correspond to three apexes of a triangle. Such a cam plate 110 may be made of a rigid material of which the shape is not deformed.

The ball bearing 120 is in the form of a ring shape, and a plurality of balls 130 are disposed on the outer face thereof to surround the cam plate 110. The inner face of the ball bearing 120 gets in contact with the outer face of the cam plate 110, and a part of the outer face of the ball bearing 120 gets in contact with a part of the inner face of the flex spline 200.

Because the ball bearing 120 is elastically deformed by the shape of the cam plate 110, the ball bearing 120 includes protrusions 120a, 120b and 120c formed on the outer circumferential surface to correspond to the protrusions 110a, 110b and 110c of the cam plate 110. The protrusions 120a, 120b and 120c formed at three or more positions corresponding to the protrusions 110a, 110b and 110c of the cam plate 110 are formed at regular intervals, and correspond to three apexes of a triangle.

The protrusions 120a, 120b and 120c of the ball bearing 120 elastically deform the flex spline 200, so that the three or more positions of the flex spline 200 get in contact with the inner face of the circular spline 300, so that teeth of the flex spline are engaged with teeth of the circular spline at the three positions simultaneously.

As described above, because the crescent protrusions are formed at the three or more positions on the outer circumferential surface of the circular cam plate 110, the teeth of the flex spline 200 and the circular spline 300 combined with the cam plate can be simultaneously engaged with each other at three positions.

The flex spline 200 is formed in a cup shape, and the wave generator 100 is mounted therein. The flex spline 200 has teeth formed on the outer circumferential surface thereof.

Referring to FIG. 2c, the protrusions 110a, 110b and 110c formed on the outer circumferential surface of the central part 111 are respectively included in different three circles as a part of each of the circles, and diameters of the three different circles are all equal.

Radiuses R2 of the three circles respectively including the protrusions 110a, 110b and 110c is smaller than a radius R1 of the circular central part 111, and the radius relation is defined in the following [Math formula 1].

$$R2 = k \times R1, \quad \text{[Math formula 1]}$$

wherein k is a proportional constant and is within a range of 0.6 to 0.8, and the most preferably, k is 0.7. If k is smaller than 0.6, namely, k<0.6, since the whole shape of the cam plate 110 is not circular, the balls 130 are not moved smoothly and it may cause a problem in rotation. However, if k is larger than 0.8, namely, k>0.8, since the whole shape of the cam plate 110 is nearly circular, the teeth engaged parts at the three positions get too wider.

Figure 3:
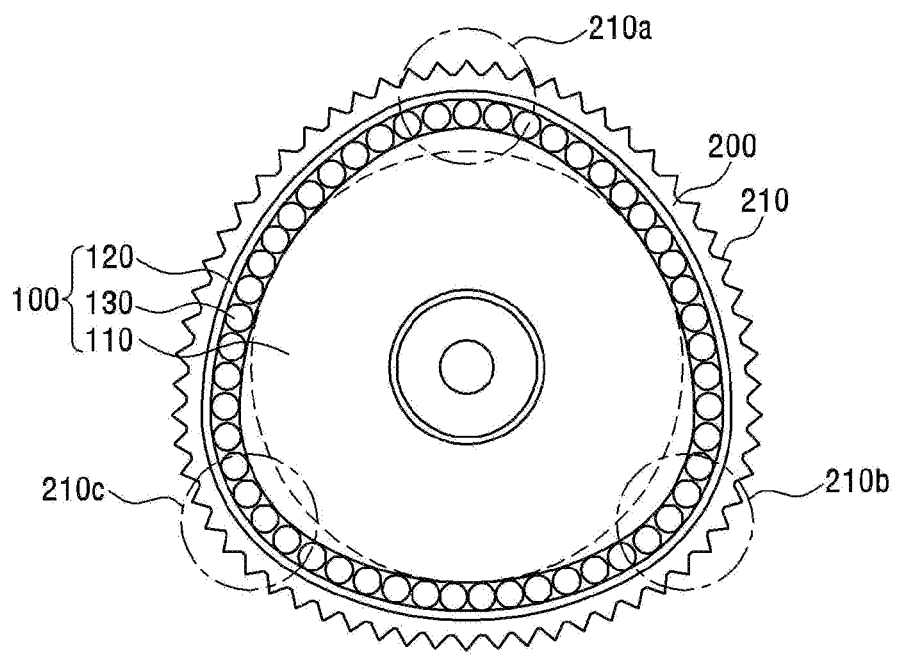
FIG. 3 is a view showing a state where the wave generator is mounted on a flex spline.

FIG. 3 is a view showing a state where the wave generator is mounted on a flex spline.

Referring to FIG. 3, the flex spline 200 is made with a metal elastic body and is elastically deformed by the shape of the wave generator 100 since the wave generator 100 is mounted inside the flex spline 200.

The elastically deformed part of the flex spline 200 which is elastically deformed by the protrusions 120a, 120b and 120c gets in contact with the inner face of the circular spline 300, so that the teeth of the flex spline are engaged with the teeth of the circular spline to rotate the circular spline 300.

The circular spline 300 is formed in a ring shape, and the flex spline 200 is mounted inside the circular spline 300. The circular spline 300 is made of a rigid material not to be deformed, and includes the teeth formed on the inner circumferential surface to be engaged with the teeth of the flex spline 200.

The number of the teeth formed on the inner circumferential surface of the circular spline 300 may be more than the number of the teeth formed on the outer circumferential surface of the flex spline 200 to improve a reduction gear ratio.

Figure 4:
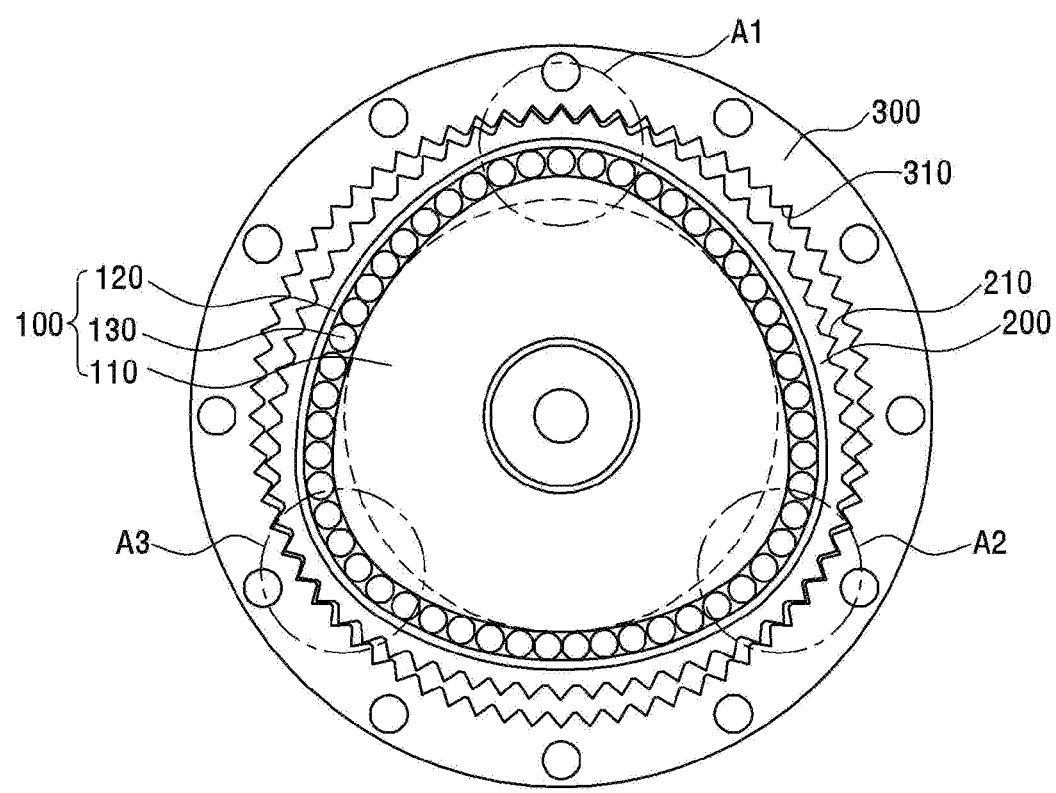
FIG. 4 is a view showing a state where the flex spline illustrated in FIG. 3 is mounted on a circular spline.

FIG. 4 is a view showing a state where the flex spline illustrated in FIG. 3 is mounted on a circular spline.

Referring to FIG. 4, because the flex spline is mounted inside the circular spline of the ring shape, the wave generator may have gear engagement at the three or more positions A1, A2 and A3. The teeth formed on the outer circumferential surface of the flex spline which is elastically deformed by the shape of the wave generator are engaged with the teeth formed on the inner circumferential surface of the circular spline.

Because the teeth formed on the outer circumferential surface of the flex spline are engaged with the teeth formed on the inner circumferential surface of the circular spline at the three different positions at regular intervals, it can prevent a Dedoi-dal phenomenon that the teeth between the circular spline and the flex spline get out of alignment. Here, Dedoi-dal phenomenon means that the engagement state of the teeth is shifted to one side when there is ratcheting or parts are assembled by constraint. Ratcheting means that when excess impact torque is applied during operation, the engagement of the teeth between the circular spline and the flex spline gets momentarily out of alignment without damaging the flex spline.

Figure 5:
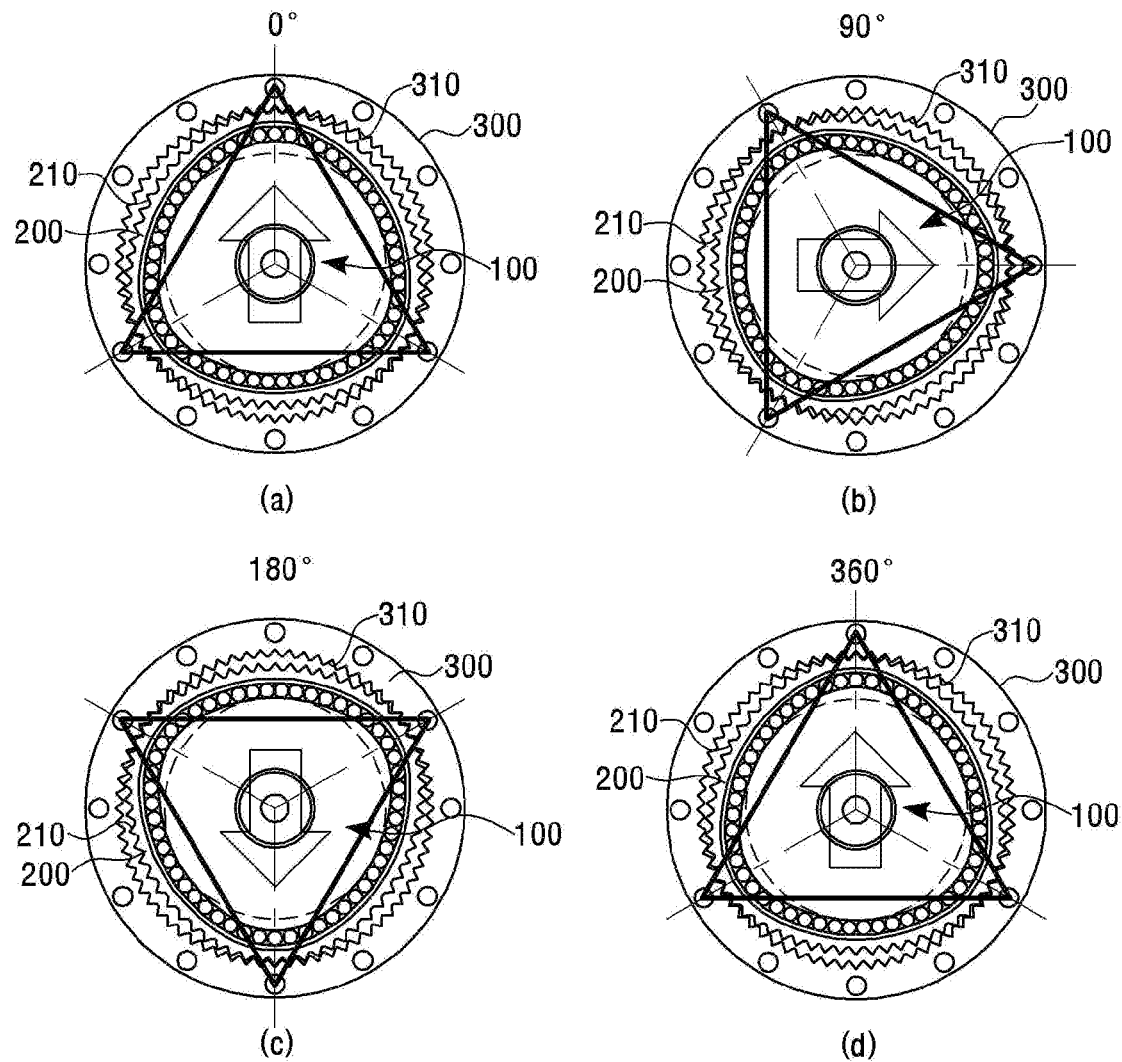
FIG. 5 is a view showing an operational principle of the reducer according to the embodiment of the present invention.

FIG. 5 is a view showing an operational principle of the reducer according to the embodiment of the present invention.

Referring to FIG. 5, the operational principle of the reducer is as follows.

(a) The flex spline 200 is elastically deformed by the wave generator 100, the teeth 210 located at the three positions are engaged with the teeth 310 formed on the inner circumferential surface of the circular spline 300, and the teeth formed at the other positions are entirely separated.

(b) When the circular spline 300 is fixed and the wave generator 100 is rotated at 90 degrees in the clockwise direction, the flex spline 200 is elastically deformed and the teeth engagement with the circular spline 300 is moved in consecutive order.

(c) When the wave generator 100 rotates at 180 degrees in the clockwise direction, the flex spline 200 moves in the counterclockwise direction.

(d) When the wave generator 100 rotates at 360 degrees, the flex spline 200 moves in the counterclockwise direction. In this instance, the flex spline 200 moves in the counterclockwise direction as much as the difference between the number of the teeth of the flex spline 200 and the number of the teeth of the circular spline 300.

The features, structures, effects, and the like described in the above-described embodiments include at least one embodiment of the present invention, but the present invention is not limited only to one embodiment. Further, the features, structures, effects, and the like illustrated in each embodiment may be combined or modified to other embodiments by those skilled in the art. Therefore, contents related to the combination or the modification should be interpreted to be included in the scope of the invention.

In addition, while the present invention has been particularly described with reference to exemplary embodiments, the present invention is not limited thereto. It will be understood by those skilled in the art that various modifications and applications, which are not illustrated in the above, may be made without departing from the spirit and scope of the present invention. For example, each component illustrated in the embodiments may be modified and made. It should be interpreted that differences related to these modifications and applications are included in the scope of the invention defined in the appended claims.

What is claimed is:

1. A reducer of a harmonic drive structure comprising:
a circular spline of a ring shape;
a flex spline mounted inside the circular spline and having teeth engaged with teeth formed at three or more positions of the inner circumferential surface of the circular spline to be rotated; and
a wave generator mounted inside the flex spline, and including a cam plate of a circular shape, and three or more protrusions formed at three or more positions of the outer circumferential surface of the circular cam plate so that the protrusions formed on the outer circumferential surface of the cam plate elastically deform the three or more positions inside the flex spline,
wherein radiuses R2 of different circles respectively including the protrusions formed at the three or more positions are all equal, and the relation between the radius R2 and a radius R1 of the central part is defined in a math formula (R2=k×R1), wherein k is a proportional constant which is within a range of 0.6 to 0.8.

2. The reducer of the harmonic drive structure according to claim 1, wherein the wave generator further comprises:
a ball bearing formed on the outer face thereof to surround the cam plate and elastically deformed by the protrusions formed on the outer circumferential surface of the cam plate.

3. The reducer of the harmonic drive structure according to claim 1, wherein the proportional constant k is 0.7.

4. The reducer of the harmonic drive structure according to claim 1, wherein the protrusions formed at the three or more positions are formed at regular intervals around a rotary shaft of the wave generator.

5. The reducer of the harmonic drive structure according to claim 1, wherein the flex spline has teeth formed on the outer circumferential surface thereof and is elastically deformed by the shape of the wave generator, and the teeth of the elastically deformed part are engaged with the teeth formed on the inner circumferential surface of the circular spline.

* * * * *